US011465666B2

(12) United States Patent
Ochi et al.

(10) Patent No.: US 11,465,666 B2
(45) Date of Patent: Oct. 11, 2022

(54) STEERING SYSTEM

(71) Applicant: JTEKT CORPORATION, Osaka (JP)

(72) Inventors: Norihiro Ochi, Nara (JP); Yousuke Nishimura, Kariya (JP); Yasuyuki Nozawa, Kashihara (JP); Kei Kitahara, Shiki-gun (JP); Takeshi Watanabe, Kashihara (JP)

(73) Assignee: JTEKT CORPORATION, Kariya (JP)

( * ) Notice: Subject to any disclaimer, the term of this patent is extended or adjusted under 35 U.S.C. 154(b) by 479 days.

(21) Appl. No.: 16/370,211

(22) Filed: Mar. 29, 2019

(65) Prior Publication Data

US 2019/0308655 A1  Oct. 10, 2019

(30) Foreign Application Priority Data

Apr. 4, 2018  (JP) .............................. JP2018-072313

(51) Int. Cl.
| | |
|---|---|
| *B62D 1/183* | (2006.01) |
| *B62D 1/181* | (2006.01) |
| *B62D 1/10* | (2006.01) |
| B62D 1/04 | (2006.01) |

(52) U.S. Cl.
CPC ............. *B62D 1/183* (2013.01); *B62D 1/10* (2013.01); *B62D 1/181* (2013.01); *B62D 1/04* (2013.01)

(58) Field of Classification Search
CPC ................................ B62D 1/183; B62D 1/181
See application file for complete search history.

(56) References Cited

U.S. PATENT DOCUMENTS

| | | | | |
|---|---|---|---|---|
| 9,764,756 | B2* | 9/2017 | Sugioka ................... | B60N 2/06 |
| 10,577,009 | B2* | 3/2020 | Lubischer ............. | B62D 1/181 |
| 10,654,511 | B1* | 5/2020 | Cao ........................ | B62D 1/181 |
| 10,981,594 | B2* | 4/2021 | Abuaita ................. | B62D 1/183 |
| 2016/0200344 | A1* | 7/2016 | Sugioka ................. | B62D 1/181 |
| | | | | 74/493 |
| 2017/0029018 | A1 | 2/2017 | Lubischer et al. | |
| 2017/0057520 | A1 | 3/2017 | Letwin et al. | |

(Continued)

FOREIGN PATENT DOCUMENTS

| | | |
|---|---|---|
| CH | 711 640 A2 | 4/2017 |
| EP | 0 931 712 A2 | 7/1999 |

(Continued)

OTHER PUBLICATIONS

Oct. 4, 2019 Extended Search Report issued in European Patent Application No. 19167151.0.

*Primary Examiner* — James A English
*Assistant Examiner* — Joselynn Y Sliteris
(74) *Attorney, Agent, or Firm* — Oliff PLC

(57) ABSTRACT

A steering system includes: a variable mechanism that reversibly changes a configuration of an operating member between a configuration for automated driving and a configuration for manual driving, the configuration including at least one of a position, an orientation, and a shape; a variable drive source; a receiver that receives an operation of a driver; and a controller that controls the variable drive source to cause the variable mechanism to return the configuration of the operating member to the configuration for manual driving, when the receiver receives the operation of the driver in a period when the configuration of the operating member is being changed.

4 Claims, 8 Drawing Sheets

(56) References Cited

U.S. PATENT DOCUMENTS

| | | |
|---|---|---|
| 2017/0297606 A1* | 10/2017 | Kim ................. B62D 1/181 |
| 2018/0273081 A1* | 9/2018 | Lubischer ............. B62D 1/19 |
| 2020/0055481 A1* | 2/2020 | Mimura ............... B62D 1/18 |

FOREIGN PATENT DOCUMENTS

| | | |
|---|---|---|
| FR | 2 861 657 A1 | 5/2005 |
| JP | 2003-118591 A | 4/2003 |
| JP | 2007-083809 A | 4/2007 |

\* cited by examiner

STEERING SYSTEM

INCORPORATION BY REFERENCE

The disclosure of Japanese Patent Application No. 2018-072313 filed on Apr. 4, 2018 including the specification, drawings and abstract, is incorporated herein by reference in its entirety.

BACKGROUND OF THE INVENTION

1. Field of the Invention

The invention relates to a steering system capable of reversibly changing a configuration including at least one of a position, an orientation, and a shape of an operating member, such as a steering wheel, between during automated driving and during manual driving.

2. Description of Related Art

When a vehicle is at an automated driving level of three or above where a system is fully responsible for automated driving, a driver does not need to be responsible for operation of the vehicle and, accordingly, the driver does not need to hold a steering wheel. Hence, if a space in front of the driver is widened by changing a configuration of the steering wheel, comfort felt by the driver can be enhanced. To achieve this, a technique that displaces a steering wheel toward a front side in a vehicle to a withdrawn place during automated driving has been proposed (see, for example, Japanese Patent Application Publication No. 2003-118591 (JP 2003-118591 A)).

A technique that provides a stopper and stops supplying current to a motor based on an increase in a value of current supplied to the motor, in order to stop a steering wheel in a predetermined configuration has been proposed (see, for example, Japanese Patent Application Publication No. 2007-83809 (JP 2007-83809 A)). The increase in the value of current occurs when a motion of the steering system is mechanically stopped by the stopper.

However, when a driver desires to resume manual driving in a period when the steering wheel is retracting upon start of automated driving, the need for waiting for the steering wheel to complete retracting and then advancing the steering wheel back to a position for manual driving arises.

SUMMARY OF THE INVENTION

An object of the invention is to provide a steering system capable of, even in a period when an operating member, e.g., a steering wheel, is undergoing a configuration change upon start of automated driving, returning a configuration of the operating member to a configuration for manual driving in response to an operation of a driver.

According to an aspect of the invention, a steering system used in steering a vehicle includes: a variable mechanism that reversibly changes a configuration of an operating member between a configuration for automated driving and a configuration for manual driving, the configuration including at least one of a position, an orientation, and a shape; a variable drive source that drives the variable mechanism; a receiver that receives an operation of a driver; and a controller that controls the variable drive source to cause the variable mechanism to return the configuration of the operating member to the configuration for manual driving, when the receiver receives the operation of the driver in a period when the variable mechanism is changing the configuration of the operating member from the configuration for manual driving to the configuration for automated driving.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of a steering system according to the invention are described below with reference to the drawings. It should be noted that any embodiment described below illustrates a comprehensive or specific example. Numerical values, shapes, materials, elements, arrangements and connections of the elements, steps, sequences of the steps are merely exemplary and not intended to limit the invention. Of the elements of the embodiments presented below, any element that is not described in an independent claim indicating a most superordinate concept is described as an optional element.

It should be noted that the drawings are schematic, in which emphasis, omission, and ratio adjustment are made as appropriate to illustrate the invention, and may differ from actual shapes, positional relationships, and ratios.

Figure 1:
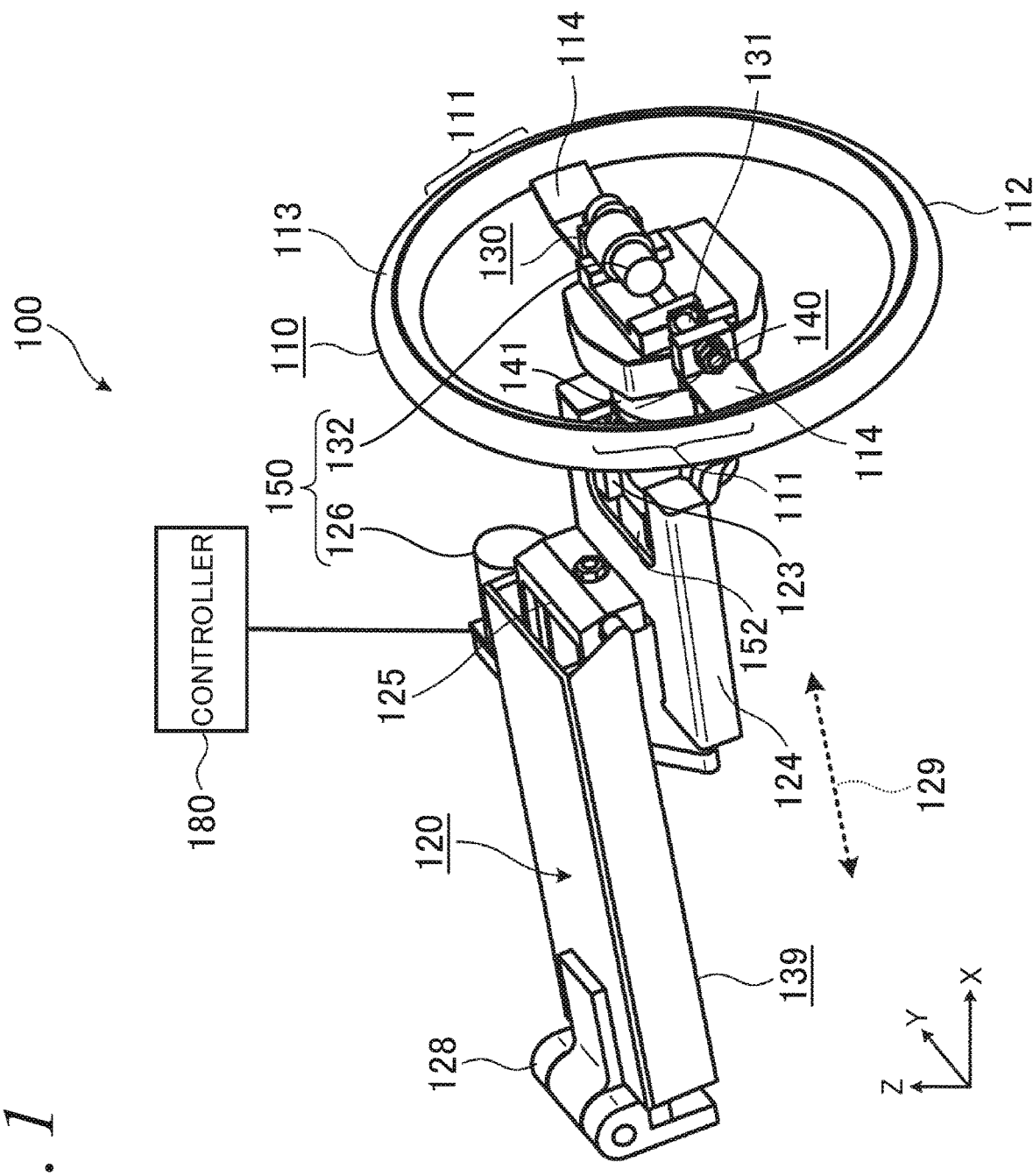
FIG. 1 is a perspective view illustrating a steering system according to an embodiment of the invention.
Figure 2:
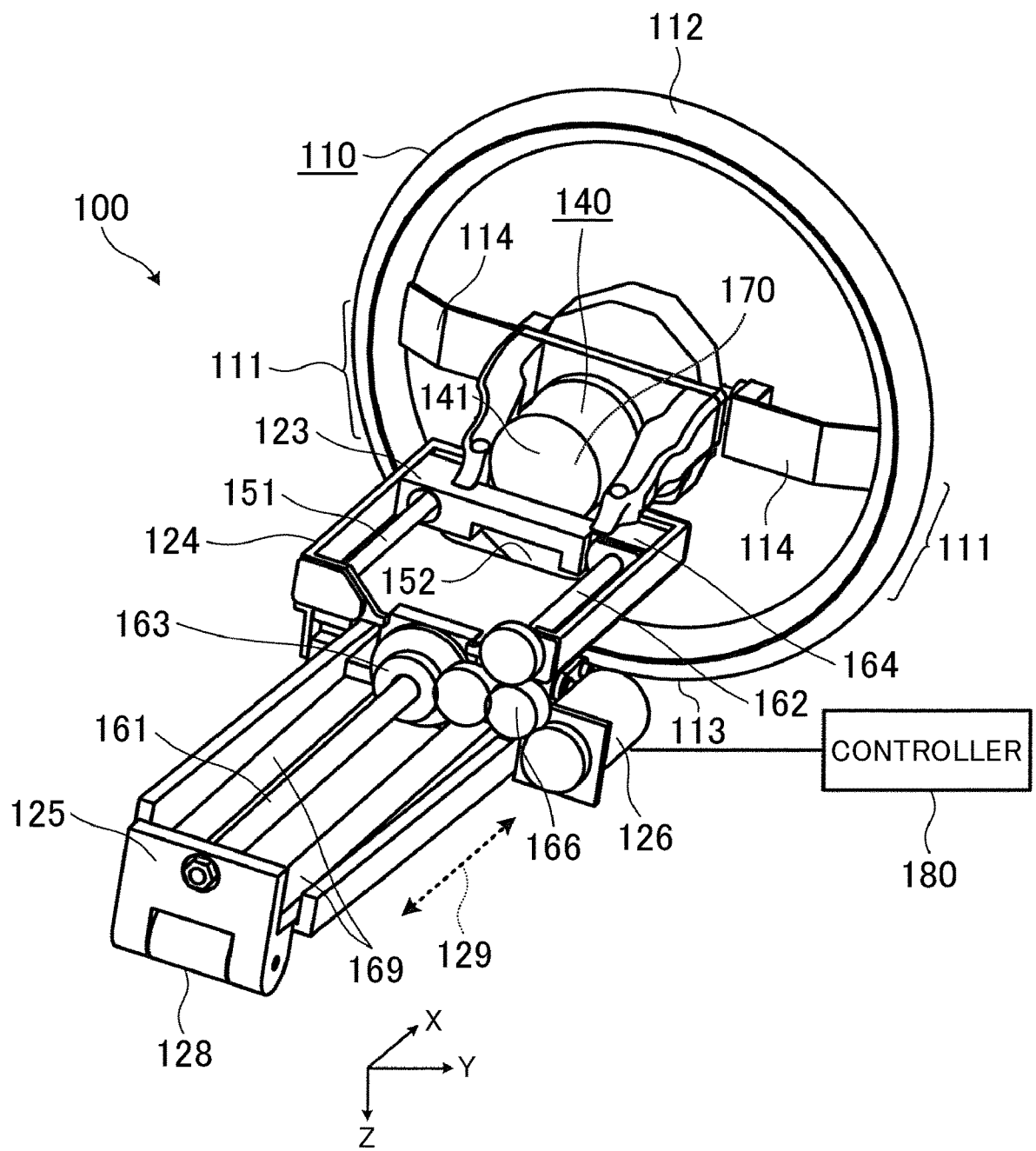
FIG. 2 is a perspective view illustrating the steering system according to the embodiment as viewed from below the front of a vehicle.

FIG. 1 is a perspective view illustrating a steering system as viewed from above, on a driver's side. FIG. 2 is a perspective view illustrating the steering system as viewed from below the front of a vehicle. A steering system 100 is a system mounted in a vehicle, e.g., an automobile, a bus, a truck, construction equipment, or agricultural equipment, capable of switching between manual driving and automated driving. The steering system 100 includes a variable mechanism 120, a variable drive source 150, a receiver 170, and a controller 180. In the embodiment, the steering system 100 includes a reaction-force generating device 140.

The steering system 100 is a system incorporated in a so-called steer-by-wire system. The steering system 100, in which an operating member 110 and tires are not mechanically connected, outputs information indicating a steering angle of the operating member 110 to cause a motor to turn the tires to thus perform steering.

The operating member 110 is what is generally referred to as a steering wheel to be operated by a driver to indicate an angle of wheels (steered angle) during manual driving. The operating member 110 includes two straight-ahead grip portions 111 and a lower coupling portion 112. In the embodiment, the operating member 110, which is an annular member, further includes an upper coupling portion 113 and connecting portions 114.

The straight-ahead grip portions 111 are portions arranged so as to be easily gripped by both hands of a driver, one in each of the hands, when the operating member 110 is in an orientation for causing the vehicle to travel straight ahead during manual driving. Portions of the operating member 110 each located in a range of an angle about a steering axis of approximately 30 degrees upward from a horizontal plane containing a center of rotation of the operating member 110 correspond to the straight-ahead grip portions 111.

The lower coupling portion 112 is a portion that couples the two straight-ahead grip portions 111 and is curved to protrude downward. In the embodiment, the lower coupling portion 112 is curved into a semicircle.

The upper coupling portion 113 is a portion that couples the two straight-ahead grip portions 111 and is curved to protrude upward. In the embodiment, the upper coupling portion 113 is curved into an arc.

The lower coupling portion 112 and the upper coupling portion 113 may be gripped by a driver during manual driving. Accordingly, the driver can select hand positions for steering. This can increase ease of steering and reduce faulty steering operations to thus enhance safety. Furthermore, when the operating member 110 has an annular shape, its structural strength as a whole is increased, and safety of the driver in case of secondary collision can be increased because the operating member 110 has no sharply projecting portion.

The operating member 110 is described as being divided into the two straight-ahead grip portions 111, the lower coupling portion 112, and the upper coupling portion 113. However, because the operating member 110 is an annular member, it is difficult to definitely differentiate the two straight-ahead grip portions 111, the lower coupling portion 112, and the upper coupling portion 113.

The shape of the operating member 110 is not limited to a ring and may alternatively be, for example, an oval, an elongated circle, a polygon, or a combination of these shapes. The lower coupling portion 112 and the upper coupling portion 113 are described as being curved. However, it should be noted that the term "curved" as used in this specification and appended claims refers to a concept encompassing straight lines and corners, e.g., a part of a polygon.

Each of the connecting portions 114 is a member that connects the operating member 110 and a folding mechanism 130 and holds the operating member 110 such that an outer circumference of the operating member 110 is centered on the steering axis. In the embodiment, the connecting portion 114 is a member projecting from lower end portions of the two straight-ahead grip portions 111 toward the steering axis of the operating member 110 and extends along a diameter of the operating member 110 that lies in the horizontal plane when the operating member 110 is in the orientation that causes the vehicle to travel straight ahead.

The shape, arrangement, orientation, and the like of the connecting portion 114 are not limited to those illustrated in, for example, the drawings and may be selected.

The variable mechanism 120 is a mechanism that reversibly changes a configuration of the operating member 110 including at least one of a position, an orientation, and a shape between a configuration for automated driving and a configuration for manual driving. In the embodiment, the variable mechanism 120 includes an advance-retract mechanism 139 that changes the position of the operating member 110 or, more specifically, causes the operating member 110 to advance and retract between a front side in the vehicle and a driver's side. The variable mechanism 120 further includes the folding mechanism 130 that folds the operating member 110 by changing the orientation of the operating member 110 or, more specifically, tilting the operating member 110 relative to the advance-retract mechanism 139, for example.

In the embodiment, the variable mechanism 120 does not include a mechanism that changes the shape of the operating member 110. However, examples of the variable mechanism 120 include a mechanism that folds the operating member 110 in half and a mechanism capable of, on an assumption that the operating member 110 can be divided into a plurality of parts, connecting and disconnecting the parts.

Although the structure and shape of the advance-retract mechanism 139 are not particularly limited, a telescopic mechanism with multiple stages of extension is employed as the advance-retract mechanism 139 in the embodiment. Specifically, the advance-retract mechanism 139 includes a movable member 123, an intermediate guide 124, a base guide 125, a first advance-retract mechanism 121, and a second advance-retract mechanism 122.

The movable member 123 is a member to which the operating member 110 is attached and that reciprocates in an advance-retract direction 129 between the front side in the vehicle and the driver's side. In the embodiment, the operating member 110 is attached to the movable member 123 via the reaction-force generating device 140 and the folding mechanism 130. Although the shape and structure of the movable member 123 are not particularly limited, the movable member 123 is sized so as to be accommodated within the box-shaped intermediate guide 124 in the embodiment. The movable member 123 extending in the advance-retract direction 129 inside the intermediate guide 124 can reciprocate in the advance-retract direction 129 along a linear motion guide 151 fixed to the intermediate guide 124.

The intermediate guide 124 is a member that guides the movable member 123 in the advance-retract direction 129 and that itself reciprocates in the advance-retract direction 129. The intermediate guide 124 is configured to protrude farther toward the driver's side than the base guide 125 does when the intermediate guide 124 reaches an end of the base guide 125 on the driver's side. This allows the movable member 123 to advance and retract a distance longer than a length of the base guide 125.

Although the shape and structure of the intermediate guide 124 are not particularly limited, the intermediate guide 124 in the embodiment has a rectangular box shape and contains the linear motion guide 151 extending in the advance-retract direction 129 and accommodated in the intermediate guide 124. A notch portion 152, into which a part of the reaction-force generating device 140 is fit when the operating member 110 is retracted, is provided in a top plate of the box-shaped intermediate guide 124. The notch portion 152 is a slit-like portion extending through the top plate in its thickness direction. The intermediate guide 124 is box-shaped to accommodate a part of the reaction-force generating device 140 when the operating member 110 is retracted. This allows the steering system 100, with the operating member 110 retracted, to be compact particularly in vertical size.

Figure 4:
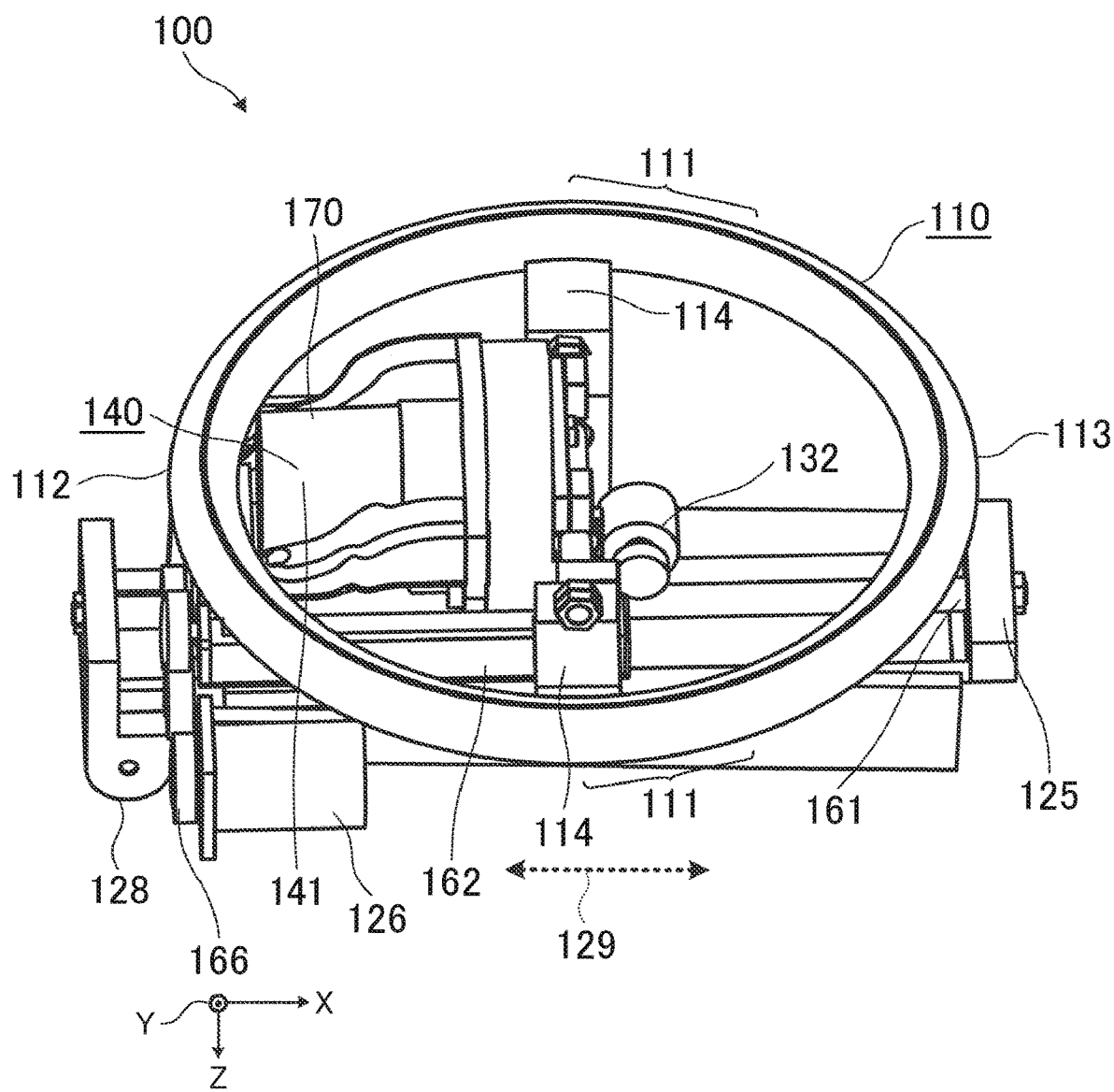
FIG. 4 is a perspective view illustrating the steering system according to the embodiment in a retracted state as viewed from below the side of the vehicle.
Figure 8:
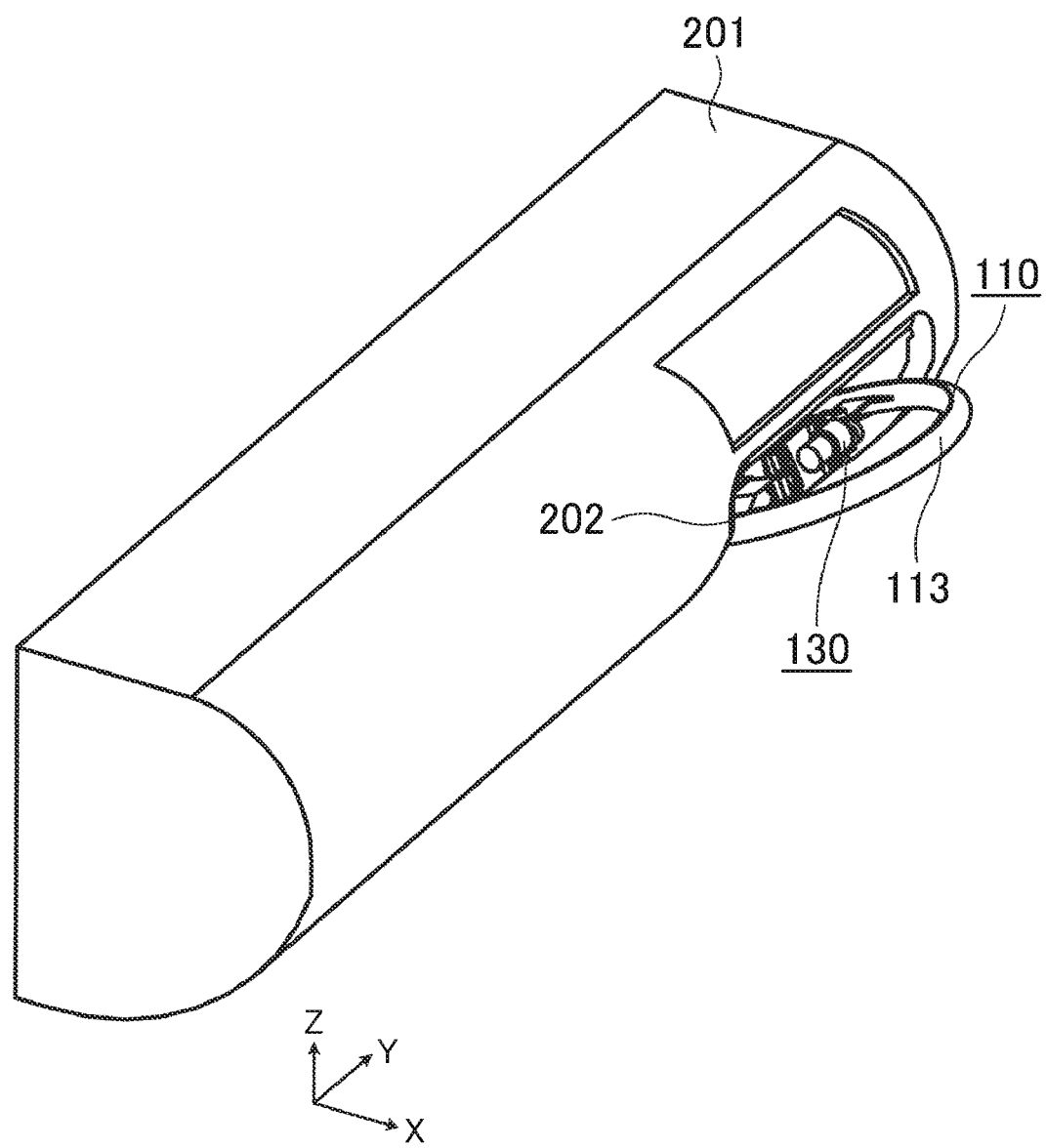
FIG. 8 is a perspective view of the operating member nearing completion of its stowing into the dashboard.

The base guide 125 is a member that is attached to the vehicle and guides the intermediate guide 124 in the advance-retract direction 129. The shape and structure of the base guide 125 are not particularly limited. In the embodiment, the base guide 125 is a member longer than the movable member 123 and the intermediate guide 124 in the advance-retract direction 129. As illustrated in FIG. 4, the base guide 125 is configured to be approximately equal to or slightly longer than a diameter of the annular operating member 110. This allows the steering system 100, with the folded operating member 110 retracted as illustrated in FIG. 8, to be compact in size particularly in the advance-retract direction 129. The base guide 125 includes two rails 169 that guide the intermediate guide 124 in the advance-retract direction 129 and limits rotation of the intermediate guide 124 about an axis extending in the advance-retract direction 129.

In the embodiment, the base guide 125 is attached to the vehicle via a hinge 128. The base guide 125 employs a tilt mechanism that is fixed to the vehicle in the advance-retract direction 129 and tilts about the hinge 128.

The first advance-retract mechanism 121 is a mechanism that reciprocates the intermediate guide 124 relative to the base guide 125 and includes an advance-retract drive source 126. The structure of the first advance-retract mechanism 121 is not particularly limited. A ball screw, in which a first screw shaft 161 and a first nut 163 move linearly relative to each other, is employed as the first advance-retract mechanism 121 in the embodiment. The first advance-retract mechanism 121 further includes a driving-force transmission mechanism 166, to which a driving force is transmitted.

The first screw shaft 161 is a shaft having a helical groove in its outer circumferential surface and extends in the advance-retract direction 129. The first screw shaft 161 is fixed to the base guide 125 such that the first screw shaft 161 does not move in any of the advance-retract direction 129 and a direction of rotation about the axis extending in the advance-retract direction 129.

The first nut 163 is a member that engages in the helical groove provided in the circumferential surface of the first screw shaft 161 inserted through the first nut 163 with balls provided between the first nut 163 and the first screw shaft 161. The first nut 163 is attached to an end face of the intermediate guide 124 such that the first nut 163 is fixed in the advance-retract direction 129 but rotates in the direction of rotation about the axis extending in the advance-retract direction 129. The first nut 163 is attached to the intermediate guide 124 such that the first nut 163 projects toward the base guide 125. The first screw shaft 161 is inserted through the first nut 163 to pass by outside the intermediate guide 124.

The advance-retract drive source 126 imparts a rotary driving force to the first nut 163 via the driving-force transmission mechanism 166. Rotating the first nut 163 forward and backward reciprocates the intermediate guide 124 relative to the first screw shaft 161 extending in the advance-retract direction 129. The intermediate guide 124 is not rotated by rotation of the first nut 163 because the rails 169 of the base guide 125 limit rotation of the intermediate guide 124.

No particular limitation is imposed on the driving-force transmission mechanism 166, and any mechanism, e.g., a belt drive or a combination of gears, that imparts a rotary driving force to the first nut 163 can be employed as the driving-force transmission mechanism 166. In the embodiment, a combination of gears is employed.

The second advance-retract mechanism 122 is a mechanism that reciprocates the movable member 123 relative to the intermediate guide 124. Although the structure of the second advance-retract mechanism 122 is not particularly limited, a ball screw, in which a second screw shaft 162 and a second nut 164 move linearly relative to each other, is employed as the second advance-retract mechanism 122 in the embodiment.

As is the first screw shaft 161, the second screw shaft 162 is a shaft having a helical groove in its outer circumferential surface. The second screw shaft 162 extends in the advance-retract direction 129 and is attached to the intermediate guide 124 such that the second screw shaft 162 is fixed in the advance-retract direction 129 but rotates about the axis extending in the advance-retract direction 129 relative to the intermediate guide 124.

The second nut 164 is a member that engages with the groove of the second screw shaft 162 inserted through the second nut 164 with balls provided therebetween. The second nut 164 is fixed to an end face of the movable member 123. The second nut 164 accommodated in the intermediate guide 124 is attached to the movable member 123. Thus, the second advance-retract mechanism 122 causes the second screw shaft 162 rotatably attached to the intermediate guide 124 to rotate. Hence, the second nut 164, into which the second screw shaft 162 is inserted, can reciprocate in the advance-retract direction 129. With the second nut 164, the movable member 123 reciprocates relative to the intermediate guide 124.

The rotary driving force is imparted to the second screw shaft 162 as well as to the first nut 163 via the driving-force transmission mechanism 166. Accordingly, movement of the second screw shaft 162 and the first nut 163 is linked.

As described above, a ball screw is employed as each of the first advance-retract mechanism 121 and the second advance-retract mechanism 122 in the embodiment. This allows not only smooth advancement and retraction of the operating member 110 by the advance-retract drive source 126 but also manual advancement and retraction of the operating member 110.

Because the first advance-retract mechanism 121 and the second advance-retract mechanism 122 are ganged, it is possible to cause the operating member 110 to retract in a relatively short period of time and advance in a relatively short period of time.

The folding mechanism 130 is a mechanism that is attached to the movable member 123 and causes the operating member 110 to fold relative to the movable member 123 by tilting the operating member 110 about a folding axis (extending in a Y-axis direction in the drawings), which is an axis intersecting the advance-retract direction 129.

The folding mechanism 130 tilts the entire operating member 110 relative to the movable member 123 about the folding axis (extending in the Y-axis direction in the drawings), which is the axis intersecting the advance-retract direction 129 of the operating member 110, so that the lower coupling portion 112 is directed forward of the vehicle, toward the first advance-retract mechanism 121. Although the structure of the folding mechanism 130 is not particularly limited, the folding mechanism 130 in the embodiment includes a folding shaft 131.

The folding shaft 131 is a member arranged on or parallel to the diameter of the operating member 110. In the embodiment, the folding shaft 131 is arranged horizontally and rotatably fixed to the movable member 123. Tip ends of the connecting portions 114 of the operating member 110 are fixedly attached to the opposite ends of the folding shaft 131 in a one-to-one manner.

The variable drive source 150 is a device that generates a driving force that drives the variable mechanism 120 to change the configuration of the operating member 110. In the embodiment, the variable drive source 150 includes the advance-retract drive source 126 and a folding drive source 132.

Although no particular limitation is imposed on the advance-retract drive source 126, an electric motor is used as the advance-retract drive source 126 in the embodiment. The advance-retract drive source 126 is connected to the driving-force transmission mechanism 166 and hence generates a force that drives the movable member 123 as well as the intermediate guide 124 in the advance-retract direction 129.

The folding drive source 132 generates power that rotates the folding shaft 131 about the axis thereof to fold the operating member 110 via the folding shaft 131 by tilting the operating member 110 relative to the movable member 123. In the embodiment, an electric motor is employed as the folding drive source 132.

The reaction-force generating device 140 is a device that applies a torque to the operating member 110 against the force applied by the driver, when the driver applies a force to the operating member 110 to rotate the operating member 110 for a steering operation during manual driving. The reaction-force generating device 140 is a device that reproduces, for example, a feel of force necessary for a driver to steer a vehicle of a related art, in which tires and an operating member are mechanically connected. In the embodiment, the reaction-force generating device 140 includes a reaction force motor 141 that generates a reaction force and a torque sensor (not illustrated) that detects a driver's force. The reaction-force generating device 140 is interposed between the movable member 123 and the folding mechanism 130. The reaction-force generating device 140 may include a speed reducer.

The receiver 170 is a device that receives an operation of a driver. The "operation of a driver" means, rather than a small-scale operation performed with a fingertip on a push-button switch, a toggle switch, or a predetermined area of a touch panel etc., a relatively large-scale operation including a driver's-voice-based operation, an operation based on sound such as a hand clap, a driver's-gesture-based operation, or an operation performed using, an elbow, or a part of a palm or a fist. Specific examples of the receiver 170 include a microphone, a camera, and a motion sensor mounted in the vehicle. However, it is desirable to utilize a sensor that collects information for manual driving, a motor that runs for manual driving, and the like as the receiver 170. This is because, by utilizing such a device, the number of parts and a weight of the vehicle can be reduced and a manufacturing process of the vehicle can be simplified.

In the embodiment, the receiver 170 receives an operation of a driver based on a force applied by the driver to the operating member 110 with a finger, a palm, a fist, an elbow, or a knee in a period when the configuration of the operating member 110 is being changed to that for automated driving. Although no particular limitation is imposed on the receiver 170, specific examples of the receiver 170 may include the following.

1) The reaction force motor 141 that is included in the reaction-force generating device 140, and that outputs a current whose value differs from a normal value when a driver applies a force to the operating member 110 undergoing the configuration change 2) The torque sensor that detects a torque applied to the operating member 110 during manual driving 3) An angle sensor that detects a steering angle of the operating member 110 during manual driving 4) A motor that is used for the advance-retract drive source 126, and that outputs a current whose value differs from a normal value when a driver holds the operating member 110 and applies a force to pull the operating member 110 in the advance-retract direction 129

5) A motor that is used for the folding drive source 132, and that outputs a current whose value differs from a normal value when a driver attempts to pull the operating member 110 that is being folded The controller 180 is a so-called electronic control unit (ECU). When the receiver 170 receives an operation of a driver in a period when the variable mechanism 120 is changing the configuration of the operating member 110 from the configuration for manual driving to the configuration for automated driving, the controller 180 controls the variable drive source 150 such that the variable mechanism 120 returns the configuration of the operating member 110 to the configuration for manual driving.

Specific examples of a determining method used by the controller 180 include the following.

1) When an actual current value of the reaction force motor 141 acquired from the receiver 170 exceeds a first threshold value, the controller 180 determines that the driver intends to reverse a motion of the variable mechanism 120 and executes a control that returns the configuration of the operating member 110 to the configuration for manual driving.

2) When a difference between a stored actual current value of the reaction force motor 141 running normally and an actual current value of the reaction force motor 141 acquired from the receiver 170 exceeds a second threshold value, the controller 180 determines that the driver intends to reverse the motion of the variable mechanism 120 and executes the control that returns the configuration of the operating member 110 to the configuration for manual driving.

3) When a difference between a value of command current fed to the reaction force motor 141 and a value of actual current of the reaction force motor 141 acquired when a force is applied by the driver to the operating member 110 undergoing the configuration change exceeds a third threshold value, the controller 180 determines that the driver intends to reverse the motion of the variable mechanism 120 and executes the control that returns the configuration of the operating member 110 to the configuration for manual driving.

4) When an integral of a difference between a command current value fed to the reaction force motor 141 and an actual current value of the reaction force motor 141 acquired from the receiver 170 exceeds a fourth threshold value, the controller 180 determines that the driver intends to reverse the motion of the variable mechanism 120 and executes the control that returns the configuration of the operating member 110 to the configuration for manual driving.

5) When the controller 180 determines that the driver intends to reverse the motion of the variable mechanism 120 based on a signal from the torque sensor that detects a torque applied to the operating member 110 during manual driving, the controller 180 executes the control that returns the configuration of the operating member 110 to the configuration for manual driving.

6) When the controller 180 determines that the driver intends to reverse the motion of the variable mechanism 120 based on a signal from the angle sensor that detects a steering angle of the operating member 110 during manual driving, the controller 180 executes the operation that returns the configuration of the operating member 110 to the configuration for manual driving.

When the driver holds the operating member 110 and applies a force to pull the operating member 110 in the advance-retract direction 129 without applying a force that rotates (twists) the operating member 110 about the axis extending in the advance-retract direction 129, the controller 180 may determine that the driver intends to reverse the motion of the variable mechanism 120 based on an actual current value of the motor used in the variable drive source 150 and executes the control that returns the configuration of the operating member 110 to the configuration for manual driving.

Figure 5:
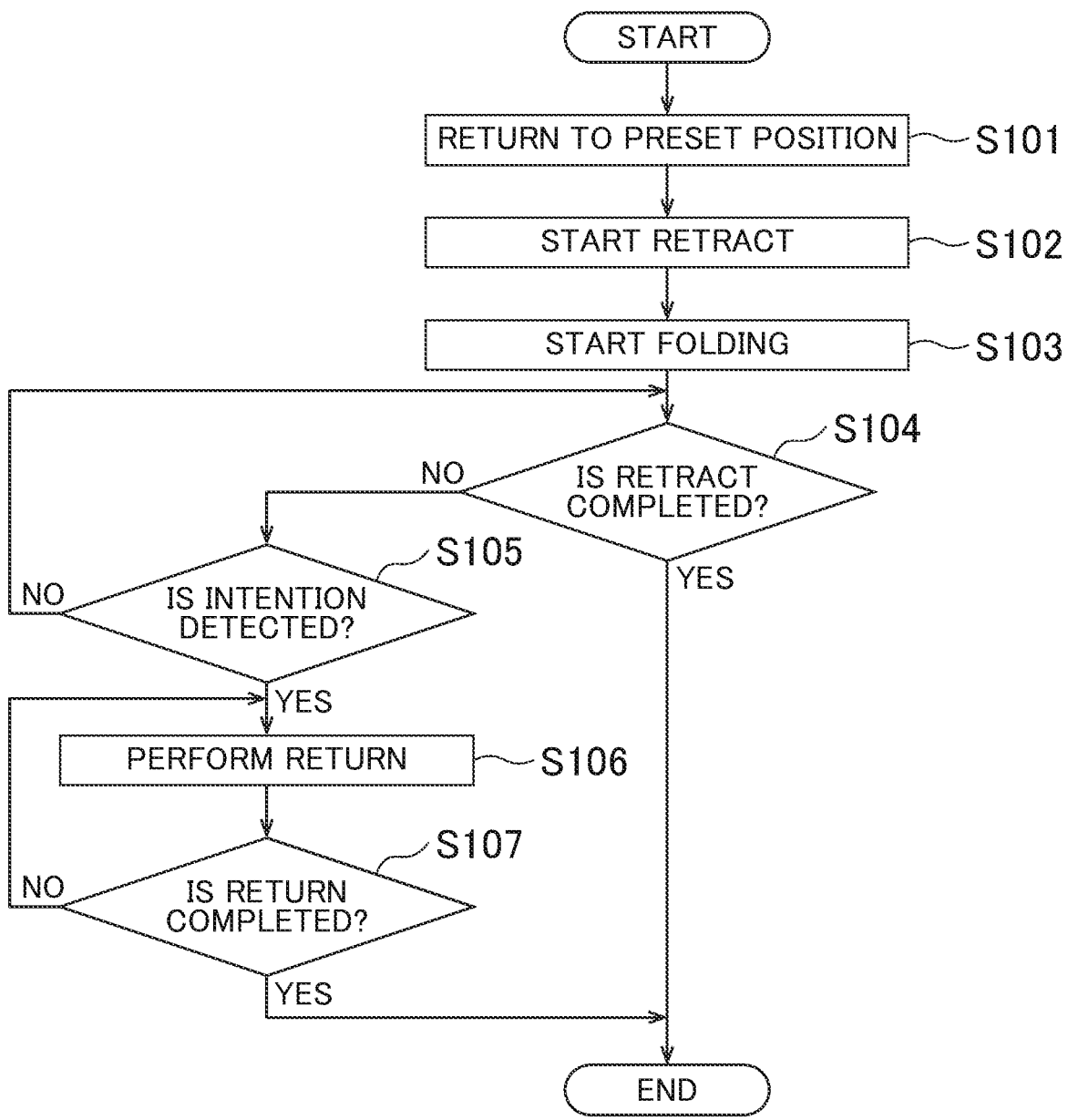
FIG. 5 is a flowchart illustrating a procedure for a returning operation in a period when the operating member is undergoing a configuration change upon start of automated driving.

Operations of the steering system 100 mounted in a vehicle are described below. FIG. 5 is a flowchart illustrating a procedure for a returning operation in a period when the operating member is undergoing a configuration change upon start of automated driving.

Figure 6:
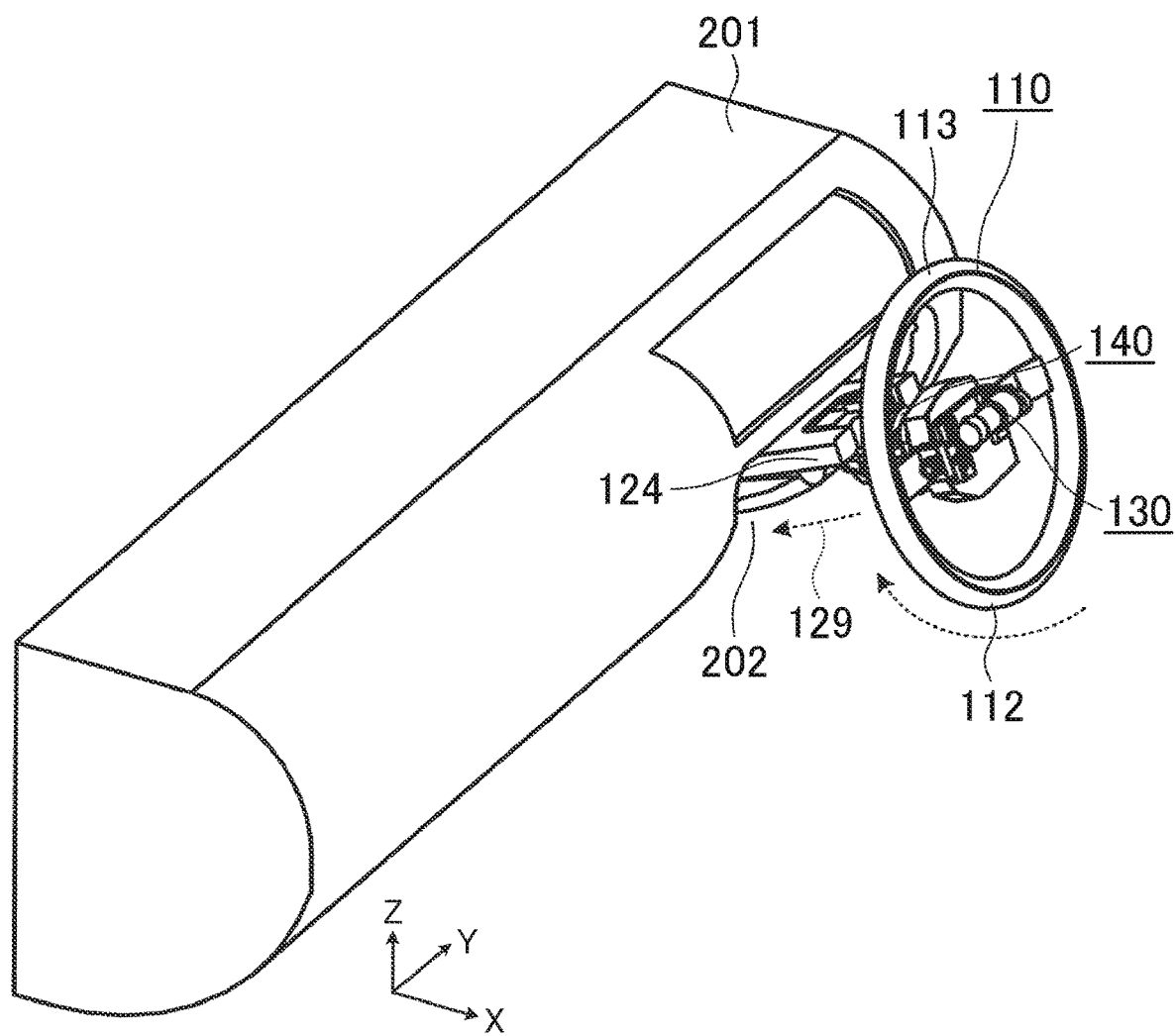
FIG. 6 is a perspective view illustrating the steering system, in which the operating member projects toward a driver, and a dashboard.

When information indicating a change from manual driving to automated driving is received by the steering system 100, the operating member 110 projecting toward the driver is returned to a preset position as illustrated in FIG. 6 (S101). Although the preset position is not limited, the preset position in the embodiment is an orientation of the operating member 110 for causing the vehicle to travel straight ahead during manual driving, namely, a so-called center position. The operating member 110 is rotationally moved by the reaction-force generating device 140 back to the preset position. The operating member 110 may be locked at the preset position to inhibit further rotation from the position.

Subsequently, the advance-retract drive source 126 is driven to cause the intermediate guide 124 and the movable member 123 to work together to start retraction of the operating member 110 (S102).

Subsequently, the folding mechanism 130 is driven to start folding the operating member 110 relative to the movable member 123 by tilting the operating member 110 about the axis intersecting the advance-retract direction 129 (S103).

A temporal order of returning the operating member 110 to the preset position, starting retraction of the operating member 110, and starting folding the operating member 110 is not limited to the order described above and may be changed or, alternatively, at least two of them may be performed concurrently. The retraction and the folding may be performed within a same period of time. The retraction may be started after the operating member 110 has been folded. Starting the retraction of the operating member 110 earlier than the folding can reduce the possibility of interference between the driver and the upper coupling portion 113 of the operating member 110 that is being folded.

Figure 7:
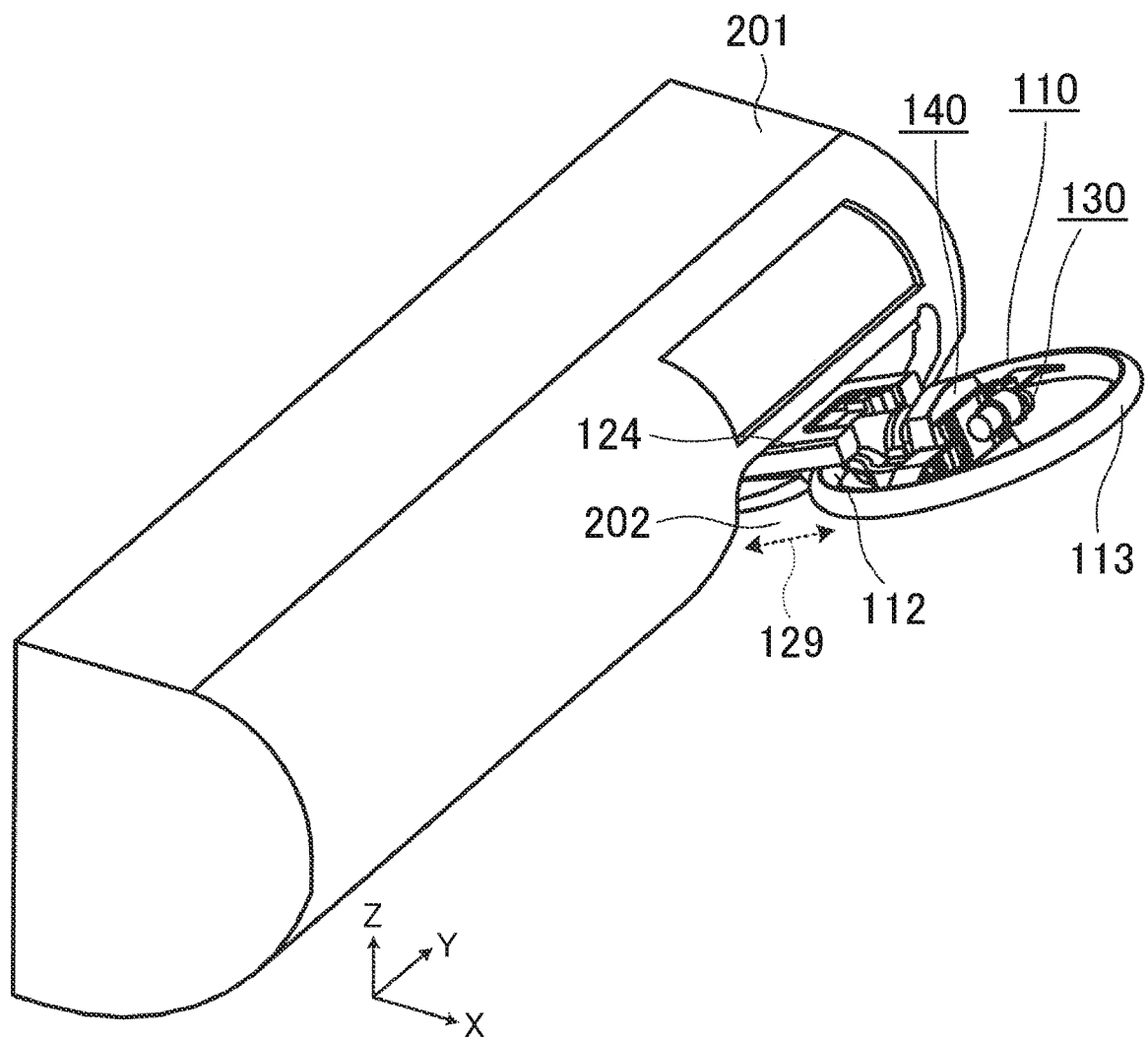
FIG. 7 is a perspective view of the operating member that starts being stowed into the dashboard.

When the configuration change of the operating member 110 is started, the controller 180 determines whether a driver's intention to resume manual driving is detected based on information received from the receiver 170 until the operating member 110 completes retracting (Yes at S104) (S105). In the embodiment, the receiver 170 receives an operation of a driver, e.g., holding the operating member 110 undergoing such a configuration change as illustrated in FIG. 6, FIG. 7, and FIG. 8 and applying a force to return the operating member 110, holding the operating member 110 undergoing the configuration change and applying a force that rotates the operating member 110 about the steering axis, applying a rotary force to the operating member 110 undergoing the configuration change by tapping the operating member 110 with a palm or a fist. The determination as to whether the intention is detected may be made based on a signal output from one sensor or one device or, alternatively, may be determined based on two or more signals from a sensor(s) and/or a device(s).

When the driver's intention to return the configuration is detected (Yes at S105), the controller 180 controls the variable drive source 150 so that the operating member 110 returns to the configuration where manual driving is enabled (S106) until the return is completed (Yes at S107).

Thus, even in a period when the operating member 110 is undergoing the configuration change upon start of automated driving, it is possible to return the operating member 110 to the state where manual driving is enabled.

When a driver's intention to return the configuration is not detected (No at S105), the following operation is performed.

Figure 3:
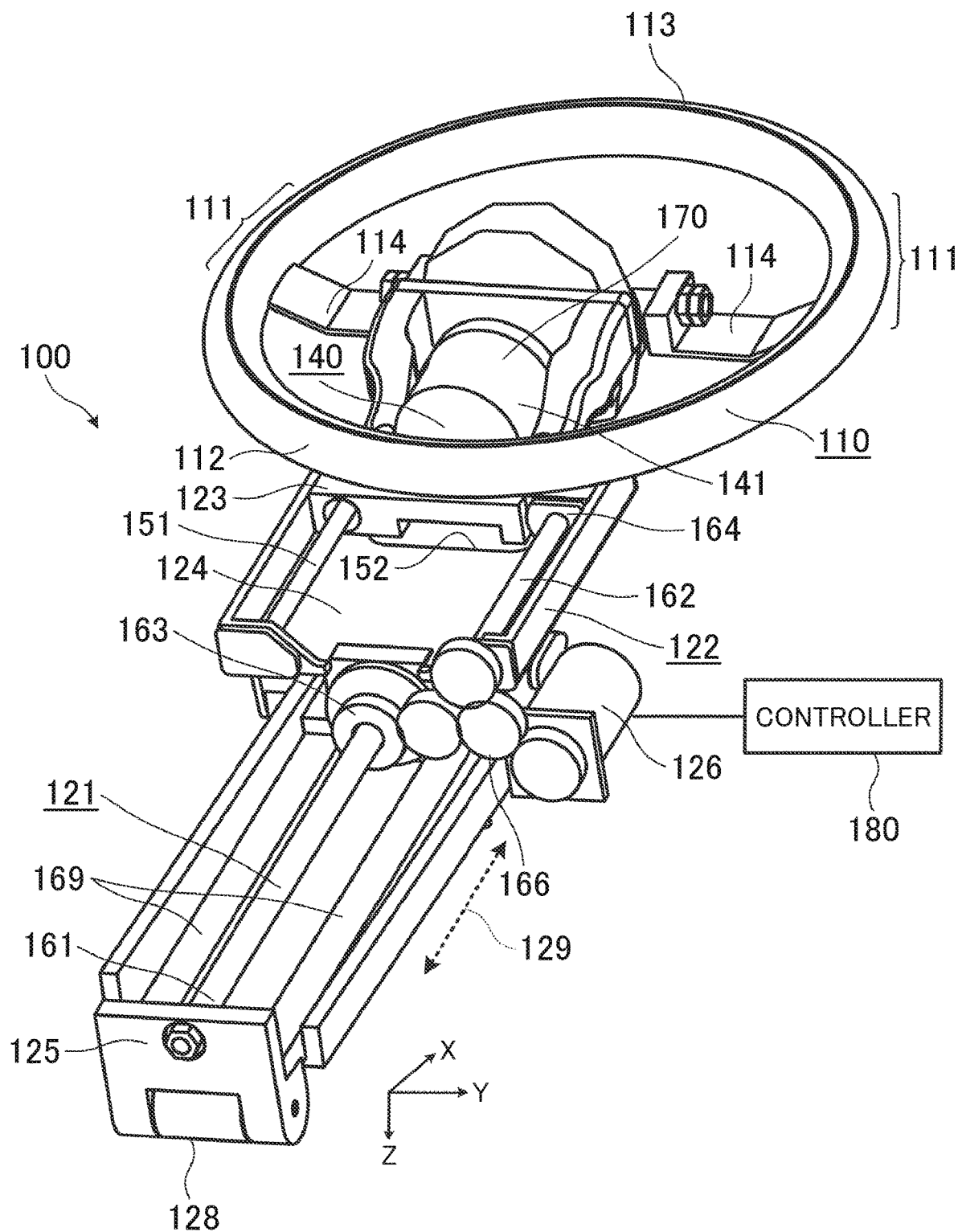
FIG. 3 is a perspective view illustrating the steering system according to the embodiment, in which an operating member is folded.

The folding mechanism 130 completes folding the operating member 110 before the operating member 110 is inserted to a dashboard 201. An angle, through which the operating member 110 is folded, is not particularly limited. In the embodiment, the folding mechanism 130 is driven by the folding drive source 132 to rotate the folding shaft 131. As a result, as illustrated in FIG. 3 and FIG. 7, the operating member 110 is tilted to be folded to an extent where a plane containing the straight-ahead grip portions 111 and the lower coupling portion 112 becomes parallel or substantially parallel to the advance-retract direction 129. By folding the operating member 110 in this manner, a projected area of the operating member 110 on the dashboard 201 in the advance-retract direction 129 can be reduced. This leads to reduction in an area of an opening 202, through which the operating member 110 passes when the operating member 110 is stowed into the dashboard 201. As a result, it is possible to improve appearance of the dashboard 201 while reducing a decrease in structural strength of the dashboard 201.

With the operating member 110 folded to be parallel or substantially parallel to the advance-retract direction 129, the reaction-force generating device 140 is arranged so as to be within a space surrounded by the straight-ahead grip portions 111 and the lower coupling portion 112. Therefore, the operating member 110 can be folded to an extent where the operating member 110 is parallel or substantially parallel to the advance-retract direction 129. When the operating member 110 is stowed into the dashboard 201, the reaction-force generating device 140 can pass through a part of the opening 202, through which the operating member 110 passes, of the dashboard 201 as well. Because it is not necessary to increase the opening 202 in size, an increase in size of the opening 202 can be reduced. Furthermore, the steering system 100 can be compactly accommodated in the dashboard 201.

Subsequently, the intermediate guide 124 and the movable member 123 are further retracted to cause the operating member 110 that has been folded, the reaction-force generating device 140, and the folding mechanism 130 to pass through the opening 202 of the dashboard 201 as illustrated in FIG. 8.

Lastly, when the operating member 110 including the upper coupling portion 113 has been stowed in the dashboard 201, the steering system 100 stops the retraction to complete stowing of the operating member 110.

Meanwhile, the steering system 100 performs the above-described procedure in a reverse order to cause the accommodated operating member 110 to advance out of the dashboard 201. During a period when the operating member 110 is advancing or when the operating member 110 completes advancing, the steering system 100 acquires a steered angle steered by automated driving and determines a steering angle based on the steered angle. The reaction-force generating device 140 may rotate the operating member 110 about the steering axis so that the operating member 110 achieves a rotation angle corresponding to the steering angle. Smooth transition from automated driving to manual driving can thus be achieved without inconveniency to the driver with the transition.

As described above, at a stage where the operating member 110 is undergoing the configuration change upon start of automated driving, a driver can express his/her intention of returning the configuration by operating the operating member 110, which is relatively large in size, in front of the driver. This eliminates an inconvenience of looking for such a small button as to be operated with a fingertip and operating the button to return the configuration.

A device used in manual driving, such as the reaction force motor 141 or the angle sensor, and/or a device involved in changing the configuration of the operating member 110, such as the variable drive source 150, is utilized also as the receiver 170 to receive an operation performed by a driver on the operating member 110. This leads to reduction in the number of parts and simplification of a manufacturing process.

The invention is not limited to the embodiments described above. For example, other embodiments may be implemented by combining elements described in the specification as desired or by eliminating one or more of the elements. Modifications of the embodiments obtained by making various modifications that may occur to those skilled in the art without departing from the purport of the invention or, in other words, within the scope limited by the terms of the appended claims, are also encompassed in the invention.

For example, an operation of a driver is not particularly limited to an operation performed on the operating member 110. For example, when a motion sensor, a camera, or the like is provided as the receiver 170, the returning operation may be performed in response to a gesture of the driver. When a microphone is provided as the receiver 170, the returning operation may be performed in response to, for example, voice or a hand clap sound of the driver.

The advance-retract mechanism 139 has been described as a device that extends and retracts in two stages. However, the steering system 100 may be a system that includes a first intermediate guide and a second intermediate guide, for example, and extends and retracts in three or more stages. The advance-retract mechanism 139 is not necessarily a mechanism that moves linearly. A mechanism that moves along a curved path or a parallel link mechanism, e.g., a pantograph mechanism, may alternatively be employed as the advance-retract mechanism 139.

The folding mechanism 130 may be a mechanism that does not include the folding drive source 132 but tilts in response to an operation of a driver. The folding mechanism 130 may be a mechanism that tilts the operating member 110 relative to the movable member 123 by utilizing a driving force applied by the advance-retract mechanism 139 to retract the operating member 110.

The invention is applicable to, for example, a vehicle, such as an automobile, a bus, a truck, agricultural equipment, or construction equipment, having wheels, a crawler, or the like and capable of manual driving and automated driving.

According to the invention, manual driving can be resumed without waiting for an operating member to complete changing its configuration at start of automated driving.

What is claimed is:

1. A steering system for use in steering a vehicle, the steering system comprising:
   a variable mechanism that reversibly changes a configuration of an operating member between a configuration for automated driving and a configuration for manual driving, the configuration including at least one of a position, an orientation, and a shape;
   a variable drive source with a motor that drives the variable mechanism;
   a receiver that receives an operation of a driver based on a change in current that flows through the motor in response to a force applied by the driver to the operating member; and
   a controller that controls the variable drive source to cause the variable mechanism to return the configuration of the operating member to the configuration for manual driving when the receiver receives the operation of the driver in a period when the variable mechanism is changing the configuration of the operating member from the configuration for manual driving to the configuration for automated driving.

2. The steering system according to claim 1, wherein the variable mechanism includes an advance-retract mechanism that causes the operating member to advance and retract and a folding mechanism that folds the operating member by tilting the operating member relative to the advance-retract mechanism, and the motor drives the advance-retract mechanism or the folding mechanism.

3. The steering system according to claim 2, further comprising
   a reaction-force generating device that includes a reaction force motor and applies a force to the operating member in a direction opposite to a force applied by the driver to rotate the operating member, wherein
   the receiver receives the operation of the driver based on a change in current that flows through the reaction force motor in response to the force applied by the driver to the operating member in the period when the configuration of the operating member is being changed to the configuration for automated driving.

4. A steering system for use in steering a vehicle, the steering system comprising:
   a variable mechanism that reversibly changes a configuration of an operating member between a configuration for automated driving and a configuration for manual driving, the configuration including at least one of a position, an orientation, and a shape;
   a variable drive source that drives the variable mechanism;
   a receiver that receives an operation of a driver;
   a controller that controls the variable drive source to cause the variable mechanism to return the configuration of the operating member to the configuration for manual driving when the receiver receives the operation of the driver in a period when the variable mechanism is changing the configuration of the operating member from the configuration for manual driving to the configuration for automated driving; and
   a reaction-force generating device that includes a reaction force motor and applies a force to the operating member in a direction opposite to a force applied by the driver to rotate the operating member, wherein the receiver receives the operation of the driver based on a change in current that flows through the reaction force motor in response to the force applied by the driver to the operating member in the period when the configuration of the operating member is being changed to the configuration for automated driving.

\* \* \* \* \*